Figure 1:
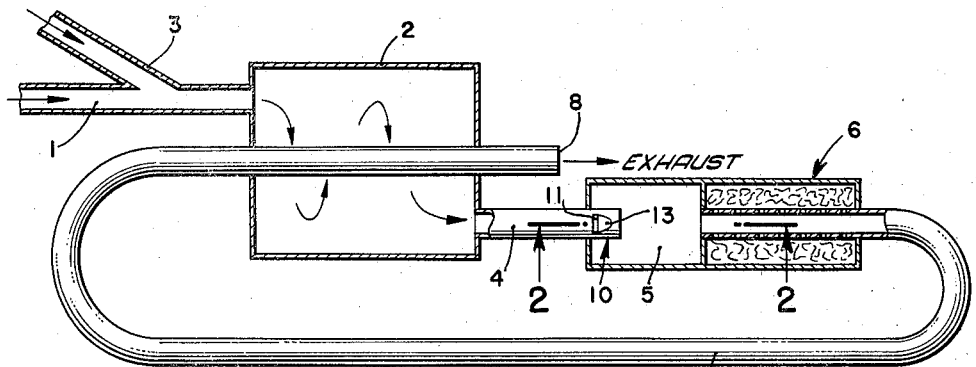

Aug. 17, 1965 W. PENNINGTON 3,201,338
EXHAUST PURIFYING ARRANGEMENT
Filed March 28, 1960 2 Sheets-Sheet 1

INVENTOR.
WILLIAM PENNINGTON
BY
ATTORNEY.

Aug. 17, 1965  W. PENNINGTON  3,201,338
EXHAUST PURIFYING ARRANGEMENT
Filed March 28, 1960  2 Sheets-Sheet 2
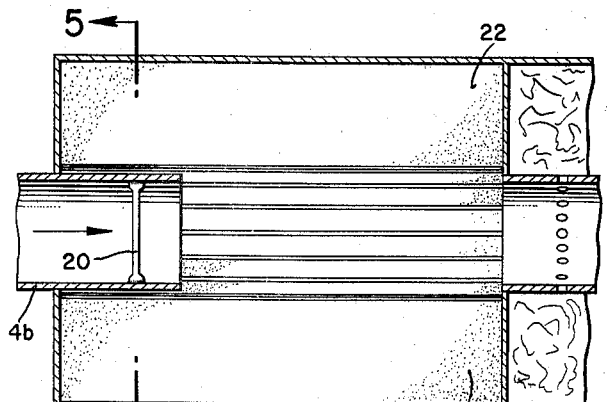
FIG. 4.
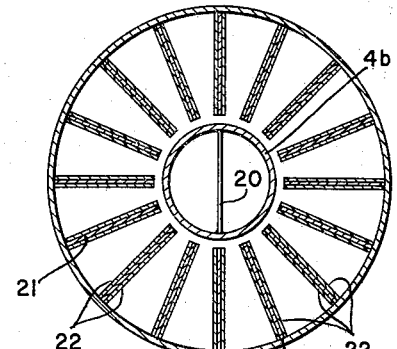
FIG. 5.
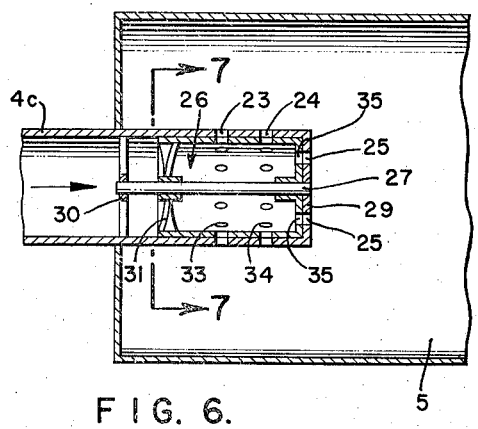
FIG. 6.
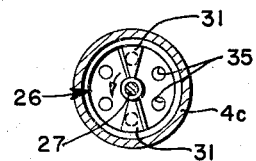
FIG. 7.
FIG. 8.
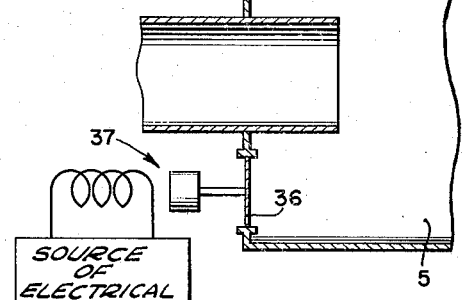
FIG. 9.
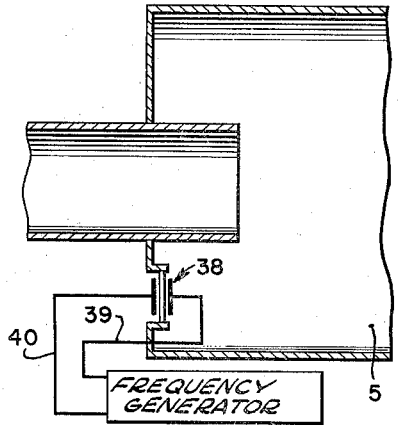
*INVENTOR.*
WILLIAM PENNINGTON
BY
ATTORNEY.

United States Patent Office 3,201,338
Patented Aug. 17, 1965

3,201,338
EXHAUST PURIFYING ARRANGEMENT
William Pennington, 3834 Crestway Drive,
Los Angeles 43, Calif.
Filed Mar. 28, 1960, Ser. No. 18,044
1 Claim. (Cl. 204—193)

This invention pertains to an arrangement for purifying the products of combustion discharged into the atmosphere from a combustor so as to remove objectionable, smog-producing ingredients.

Research activities in the field of smog control have indicated that the products exhausted by combustors are the principal supply of the pollutants in the atmosphere which result in smog. The internal combustion engines of automobiles and other vehicles have been identified as the primary source of such contamination. Primarily, smog results from the reaction of sunlight under certain conditions with the unburned fractions in the exhaust gases. Today's higher compression ratios permit the fuels to produce even more active components than previously, caused by the influence of the resulting high pressures and temperatures within the engines.

It also has been established that smog-producing substances may be removed from exhaust gases by oxidation in a catalytic burner, or in an afterburner type of device. Around eighty percent removal of the smog-producing ingredients from automotive exhausts has been named as an acceptable figure for reducing smog to unobjectionable levels. Known catalytic or afterburner devices are capable of attaining such efficiency. However, this has heretofore not been possible for a unit of anywhere near practical size and cost. In other words, in order to achieve a required degree of efficacy, it is necessary to make units of such bulk, complexity and expense that they are of no real value.

Several reasons are advanced why units of usable construction have not been able to effectively eliminate pollutants from the gases. For one thing, the additive air introduced into the exhaust to make possible the necessary chemical reaction may not have the opportunity to become sufficiently well mixed with the exhaust gases to allow the reaction to take place. Also, the exhaust gases themselves may not be mixed homogeneously. In addition, the particles or droplets of unburned components within the exhaust may become surrounded by layers of previously reacted gases so that there no longer is access to their surfaces to enable a reaction to take place. Where catalytic devices are used, much of the gases may never come in contact with the catalytic surfaces. Possibly the chemical reactions for reducing the smog-producing ingredients to harmless components are inherently too slow to take place before the gases are exhausted from a device that does not go beyond practical dimensions. Any one or a combination of these explanations may account for the lack of success realized from past efforts to purify engine exhaust gases. Hence, to date the smog menace remains unabated.

The present invention provides a means by which the efficiency of various smog corrective devices may be greatly increased, permitting the construction of units of manageable size and low cost, which nevertheless will operate with great effectiveness in removing virtually all smog-producing components from the gas. This is accomplished by means of a suitable sound generating means in the reaction chamber of the smog removal device, which causes the reaction therein to become much more complete.

Therefore, it is an object of this invention to provide an arrangement for purifying exhaust gases.

Another object of this invention is to provide a means of increasing the efficiency of known smog corrective arrangements.

A further object of this invention is to obtain a smog control device of small size, producible at low expense.

Yet another object of this invention is to provide a smog control arrangement having long life and trouble free operation.

A still further object of this invention is to provide a smog control arrangement that offers no penalty to the performance of the engine producing the exhaust gases.

Figure 2:
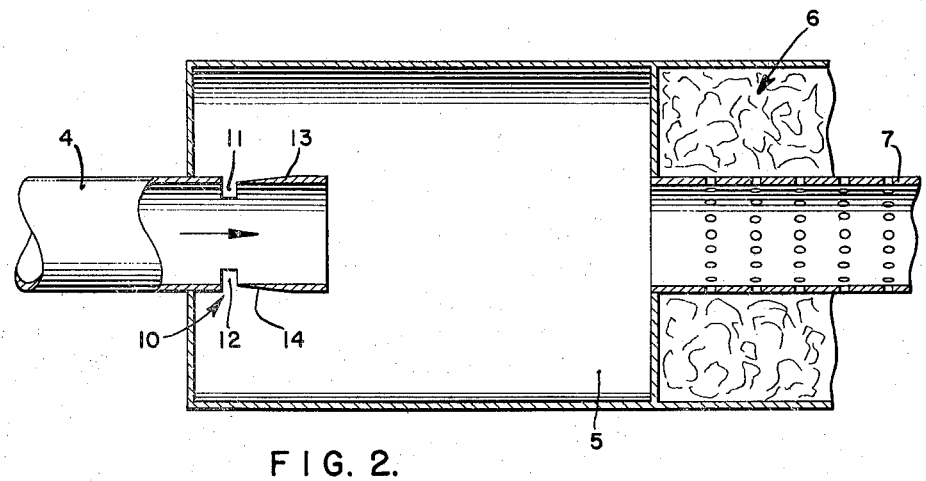
Figure 3:
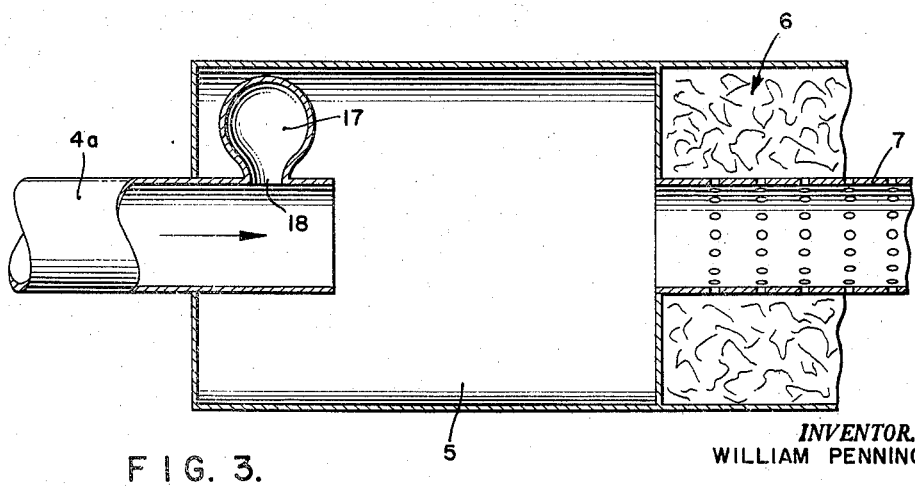

These and other objects will become apparent from the following detailed description taken in connection with the accompanying drawing in which:

FIG. 1 is a sectional view of an exhaust system employing the teachings of this invention, FIG. 2 is an enlarged sectional view, taken along line 2—2 of FIG. 1, illustrating the arrangement for generating sound in the reaction chamber, FIG. 3 is a sectional view similar to FIG. 2, showing the use of a different type of sound generator, FIG. 4 is a sectional view showing a still further sound generating device as used in connection with a catalytic type reacting device, FIG. 5 is a sectional view taken along line 5—5 of FIG. 4, FIG. 6 is a fragmentary sectional view showing the use of another type of sound generator, FIG. 7 is a sectional view taken along line 7—7 of FIG. 6, and FIGS. 8 and 9 are fragmentary sectional views showing other sound generating devices, both of which utilize electrical energy as their source.

In FIG. 1 there may be seen the overall system for an afterburner type of smog eliminating device. Exhaust pipe 1 conducts the exhaust gases from the engine (not shown) to a heat exchanger 2. Atmospheric air, entering through pipe 3, is added to the exhaust gases, also being conducted to the heat exchanger where the temperature of the mixture of exhaust gas and bleed air is raised. The air so introduced is to assure an adequate supply of oxygen for the reaction to take place with unburned substances in the exhaust gas. From the heat exchanger, the mixture is transmitted through conduit 4 to a reaction chamber 5 where additional burning takes place in order to oxidize the unburned fractions in the exhaust gas. Upon leaving the reaction chamber, the gases pass through muffler section 6 and then through pipe 7 to heat exchanger 2 where they serve to heat the incoming mixture of incompletely burned gas and bleed air. After leaving the heat exchanger, the gases are discharged to the atmosphere through outlet 8.

As long as the reaction in chamber 5 is sufficient to oxidize most of the unburned components of the gas entering this chamber, the exhaust from exit 8 will be harmless insofar as its ability to produce smog is concerned. It may be noted that in the design illustrated, the muffler section 6 is shown contiguous with the reaction chamber 5, and housed in a common shell. Generally, this is preferred for convenience and economy of manufacture, but if desired the muffler can be made a separate unit.

According to the provisions of this invention, a sound generator 10 is included to produce sound energy within reaction chamber 5. This sound generator may take any desired form, in the embodiment of FIGS. 1 and 2 being an ordinary whistle. Thus, the inner end of pipe 4 includes circumferentially extending slots 11 and 12 and tapering surfaces 13 and 14, thereby resulting in a duality of whistles in the end of pipe 4. The precise size and shape of the whistle openings are not critical and will depend upon the particular installation involved. Because of its simplicity of construction, and the ease with which it is made heat resistant, the whistle is particularly adapted for use with this invention. Conveniently, it may be provided in the inlet line to the reaction chamber, as shown, so that the mixture of gases and bleed air operate the whistle to produce the sound. However, the important feature is that the sound is created by the whistle, and if desired it can be operated in some different manner. For example, it may be formed in line 3 for operation by the incoming additive air.

The result of the creation of the sound in the reaction chamber is that the oxidation of the unburned fractions becomes much more complete. This comes about probably from an increased turbulence in the reaction chamber, or something closely akin to it. The heat transfer, molecular diffusion, mixing and chemical reaction take place much more rapidly when sound is introduced into the reaction chamber. Thus, regardless of the dominant factor in causing the low efficiency for the usual smog eliminating device, the addition of the sound energy serves to correct the undesired condition. Nothing more is needed than to produce the sound within the reaction volume or over the reactive surfaces of the smog eliminator. Therefore, instead of becoming a bulky, expensive and impractical item, a smog eliminator of acceptable characteristics can be made in a small and usable size so long as a sound generator is included to increase its efficacy.

The exact frequency selected for the sound produced will depend upon the particular installation encountered. Below a frequency of five thousand cycles per second, the sound is relatively ineffective in improving the efficiency of the device. The ability to accelerate the reaction increases with higher frequencies, advancing rapidly above frequencies of ten thousand cycles per second. Very good results are obtained in the ultrasonic range between twenty thousand and forty thousand cycles per second, although even higher freqeuncies can be used. Two or more frequencies may be used in obtaining optimum results.

Sounds of frequencies objectionable to the ear will be attenuated in the muffler which, of course, should be placed downstream of the reaction chamber. Higher ultrasonic frequencies, which are inaudible both to humans and animals, need not be removed by the muffler. Actually, the normal automobile muffler attenuates most high frequency sound in the range contemplated for this invention. Only the lower frequencies below that which would be used in connection with this invention pass through the average automobile's muffler.

The intensity of the sound in the reaction chamber generally will be within the range of 140 to 200 decibels, although there is no upper limit as far as operability is concerned. The greater the intensity, the more pronounced the results from the sound introduced into the reaction chamber. However, above 200 decibels, the sound may reach an unpleasant level. The intensity range depends to some extent upon the effectiveness of the muffler which is used in the system.

A variety of other sound generating devices may be used in the device of this invention, including the arrangement of FIG. 3. Here, a Helmholtz resonator is included in the pipe 4a leading to the reaction chamber. This type of device includes a chamber 17 communicating by opening 18 with the pipe 4a through which the exhaust gas is passing. The passage of the gas past this opening will cause resonation within chamber 17 and the creation of a sound. By proper portioning, desired frequencies can be obtained.

The sound generating system of FIGS. 4 and 5 comprises merely a stretched reed 20 extending transversely across the width of the exhaust pipe 4b. As the gas streams past the reed, the vibration of the reed causes a sound to be produced.

FIGS. 4 and 5 also illustrate the use of the invention with a catalytic type reactor rather than the afterburner type as described above. Any of the sound generators selected may be used with either type of smog corrective arrangement. The catalytic device typically may include a plurality of radially extending plates 21 arranged within the chamber 5. The surfaces of these plates are given a coating of a suitable catalyst 22 to cause the smog-producing ingredients to be reduced to harmless substances. The use of a number of plates 21, as shown, allows large surface areas of the catalyst to be provided to contact as much of the gas as possible. Despite this construction, however, a suitable catalytic burner requires the sound generator of this invention in order to attain adequate efficiency.

A siren is utilized as the sound generating means in the embodiment of the invention illustrated in FIGS. 6 and 7. As shown, the end of the exhaust conduit 4c is provided with a plurality of spaced openings 23, 24 and 25. Within the end portion of the exhaust conduit at the location of these openings is a tubular member 26, rotatably mounted on shaft 27 and supported in the end wall 29 of conduit 4c as well as in bearing block 30. An impeller 31 is attached to the shaft 27 and the tubular member 26, causing rotation of tubular member 26 as the exhaust gases pass through the pipe. Spaced openings 33, 34 and 35 are arranged in member 26 to register at intervals with the openings in the exhaust conduit, thereby producing the sound as member 26 rotates. While the siren is shown as including an impeller 31, it could be operated by other means such as, for example, an electric motor.

In the embodiment of FIG. 8, a vibrating diaphragm 36 arranged in the wall of the reaction chamber is utilized to generate the sound therein. This diaphragm, which may be made of metal for its heat resistant properties, is conveniently operated by a coil and magnet assembly 37 operated by a source of electrical energy such as the electrical system of the vehicle in which the unit is installed.

Another electrically operated device may be seen in FIG. 9. Here the sound is created by a piezoelectric generator 38 made of suitable material such as barium titanate, quartz or the like. This is connected to leads 39 and 40 to a suitable oscillator operated by the electrical system of the vehicle.

It may be seen by the foregoing, therefore, that the device of this invention can be used in connection with any of a variety of sound generating devices. The important consideration is to provide the sound where the smog-producing ingredients are to be subjected to a reaction. The particular sound generator selected will depend upon considerations of cost and reliability. In any event, it is apparent from the foregoing description that this invention provides a particularly simple yet effective means of obtaining a smog-control unit of great efficiency at a practical cost and size.

The foregoing detailed description is to be clearly understood as given by way of illustration and example only, the spirit and scope of this invention being limited solely by the appended claim.

I claim:

A smog eliminating arrangement comprising a conduit adapted to receive the exhaust of an internal combustion engine, an inlet to said conduit for introducing atmospheric air therein, a heat exchanger in said conduit downstream of said inlet for raising the temperature of the contents of said conduit, a reaction chamber connected to said conduit downstream of said heat exchanger for providing a reaction volume in which smog-producing substances are converted to nonsmog-producing substances, muffler means downstream of said chamber for attenuating sounds received therein, an exhaust conduit connected to said muffler means for discharging into the atmosphere, said exhaust conduit being connected to said heat exchanger for causing the contents of said exhaust conduit to supply heat to said heat exchanger, and sound (References on following page)

generator means for producing a sound within said chamber.

References Cited by the Examiner

UNITED STATES PATENTS

| | | | |
|---|---|---|---|
| 2,679,230 | 5/54 | Ward | 116—138 |
| 2,742,408 | 4/56 | La Porte | 204—154.1 |
| 2,745,861 | 5/56 | Bodine | 204—154.1 |
| 2,784,693 | 3/57 | Burrows | 116—137 |
| 2,854,816 | 10/58 | Bodine | 154.1 |
| 2,937,500 | 5/60 | Bodine | 154.1 |

OTHER REFERENCES

Flosdorf et al.: Journal American Chemical Society, vol. 58 (1936) pp. 1069–76.

WINSTON A. DOUGLAS, *Primary Examiner.*

JOSEPH REBOLD, MURRAY TILLMAN, JOHN R. SPECK, *Examiners.*